US012535238B2

United States Patent
Mischler et al.

(10) Patent No.: US 12,535,238 B2
(45) Date of Patent: Jan. 27, 2026

(54) DEVICE AND METHOD FOR CONTROLLING AN ORIFICE OF A VALVE IN AN HVAC SYSTEM

(71) Applicant: BELIMO HOLDING AG, Hinwil (CH)

(72) Inventors: Stefan Mischler, Wald (CH); Volkher Scholz, Zürich (CH)

(73) Assignee: BELIMO HOLDING AG, Hinwil (CH)

(*) Notice: Subject to any disclaimer, the term of this patent is extended or adjusted under 35 U.S.C. 154(b) by 398 days.

(21) Appl. No.: 18/016,758

(22) PCT Filed: Aug. 3, 2021

(86) PCT No.: PCT/EP2021/071678
§ 371 (c)(1),
(2) Date: Jan. 18, 2023

(87) PCT Pub. No.: WO2022/029127
PCT Pub. Date: Feb. 10, 2022

(65) Prior Publication Data
US 2023/0349577 A1  Nov. 2, 2023

(30) Foreign Application Priority Data
Aug. 4, 2020 (CH) .................................. 00972/20

(51) Int. Cl.
*F24F 11/46* (2018.01)
*F24F 11/58* (2018.01)
(Continued)

(52) U.S. Cl.
CPC .............. *F24F 11/46* (2018.01); *F24F 11/58* (2018.01); *F24F 11/64* (2018.01); *F24F 11/84* (2018.01);
(Continued)

(58) Field of Classification Search
CPC .. F24F 11/46; F24F 11/58; F24F 11/62; F24F 11/64; F24F 11/84; F24F 2110/10;
(Continued)

(56) References Cited

U.S. PATENT DOCUMENTS

2015/0153119 A1* 6/2015 Friedl ...................... F24F 11/46
165/293
2015/0168000 A1* 6/2015 Dempster ................ F24F 11/83
236/1 C
(Continued)

FOREIGN PATENT DOCUMENTS

CH  706 736 A1  1/2014
CN  104641184 A  5/2015
(Continued)

OTHER PUBLICATIONS

International Type Search Report for CH 9722020 dated Nov. 17, 2020.
(Continued)

*Primary Examiner* — Tameem D Siddiquee
(74) *Attorney, Agent, or Firm* — Sughrue Mion, PLLC (57) ABSTRACT

A method of controlling an orifice of a valve in an HVAC system to regulate a flow of a primary fluid through a primary side of a thermal energy exchanger of the HVAC system and thereby adjust a thermal energy transfer by the thermal energy exchanger from the primary fluid to a secondary fluid, flowing through a secondary side of the thermal energy exchanger, includes adjusting, by one or more electronic circuits, the orifice of the valve by applying an efficiency control algorithm to a control setpoint for the valve, the efficiency control algorithm processing the control setpoint for the valve to maintain energy-efficient thermal energy transfer. The method further includes the one or more electronic circuits determining the control setpoint for the
(Continued)

valve, using current performance values of the HVAC system and recorded historical data of the HVAC system.

22 Claims, 6 Drawing Sheets

(51) Int. Cl.
*F24F 11/64* (2018.01)
*F24F 11/84* (2018.01)
*F24F 110/10* (2018.01)
*F24F 140/00* (2018.01)
*F24F 140/20* (2018.01)
*F24F 140/60* (2018.01)

(52) U.S. Cl.
CPC ....... *F24F 2110/10* (2018.01); *F24F 2140/00* (2018.01); *F24F 2140/20* (2018.01); *F24F 2140/60* (2018.01)

(58) Field of Classification Search
CPC ............... F24F 2110/30; F24F 2140/00; F24F 2140/20; F24F 2140/60
See application file for complete search history.

(56) References Cited

U.S. PATENT DOCUMENTS

| | | | |
|---|---|---|---|
| 2016/0054741 A1* | 2/2016 | Thuillard | F24F 11/80 700/276 |
| 2017/0336784 A1* | 11/2017 | Koppikar | G05B 23/0229 |
| 2018/0195753 A1* | 7/2018 | Reider | F24F 11/62 |
| 2021/0215384 A1* | 7/2021 | Fentzlaff | F24F 11/84 |

FOREIGN PATENT DOCUMENTS

| | | |
|---|---|---|
| CN | 110 131 819 A | 8/2019 |
| CN | 110 553 353 A | 12/2019 |
| CN | 110 686 350 A | 1/2020 |

OTHER PUBLICATIONS

International Search Report for PCT/EP2021/071678 dated Oct. 13, 2021.

Chinese Office Action dated Jun. 9, 2025 in Application No. 202180050116.4.

* cited by examiner

DEVICE AND METHOD FOR CONTROLLING AN ORIFICE OF A VALVE IN AN HVAC SYSTEM

CROSS-REFERENCE TO RELATED APPLICATIONS

This Application is a National Stage of International Application No. PCT/EP2021/071678 filed Aug. 3, 2021, claiming priority based on Switzerland Patent Application No. 00972/20 filed Aug. 4, 2020, the contents of each of which being herein incorporated by reference in their entireties.

FIELD OF THE INVENTION

The present invention relates to a method and devices for controlling an orifice of a valve in a Heating, Ventilating and Air Conditioning (HVAC) system. Specifically, the present invention relates to a method, a control system, and a computer program product for controlling the orifice of a valve in an HVAC system to regulate the flow of a fluid through a thermal energy exchanger of the HVAC system and to adjust the thermal energy transfer by the thermal energy exchanger.

BACKGROUND OF THE INVENTION

By regulating the flow of fluid through a thermal energy exchanger of an HVAC system, it is possible to adjust the amount of energy exchanged by the thermal energy exchanger, e.g. to adjust the energy transfer rate of a thermal energy exchanger to heat or cool a room in a building. While the fluid transport through the fluid circuit of the HVAC system as driven by one or more pumps, the flow is typically regulated by varying the orifice (opening) or position of valves, e.g. manually or by way of actuators. It is known that the efficiency of thermal energy exchangers is reduced at high flow rates where the fluid rushes at an increased rate through the thermal energy exchangers, without resulting in a significant increase in energy exchange.

U.S. Pat. No. 6,352,106 describes a self-balancing valve having a temperature sensor for measuring the temperature of a fluid passing through the valve. According to U.S. Pat. No. 6,352,206, the range and thus the maximum opening of the valve are adjusted dynamically, depending on the measured temperature. The opening of the valve is modulated based on a stored temperature threshold value, the current fluid temperature, and a position command signal from a load controller. Specifically, the opening range of the valve is set periodically by a position controller, based on a temperature threshold value stored at the position controller, the current fluid temperature, and the difference between the previously measured fluid temperature and the current fluid temperature. U.S. Pat. No. 6,352,106 further describes an alternative embodiment with two temperature sensors, one placed on the supply line and the other one placed on the return line, for measuring the actual differential temperature over the load, i.e. the thermal energy exchanger. According to U.S. Pat. No. 6,352,206, in this alternative embodiment, the threshold temperature is a threshold differential temperature across the load determined by system requirements of the load. Thus, U.S. Pat. No. 6,352,206 describes controlling the flow based on a change in fluid temperature or a change in a differential temperature over the load. Accordingly, the flow is controlled based on a comparison of determined temperature changes to fixed threshold temperatures or threshold differential temperatures, respectively, which must be predefined and stored at the valve's position controller. Consequently, to avoid incorrect and inefficient settings of the valve, it must be ensured, at initial installation time of the system and whenever thermal energy exchangers are replaced with new models, that the stored threshold temperatures or threshold differential temperatures, respectively, match the type and design parameters of thermal energy exchangers used in the HVAC system.

Document DE 20 2009 004329 discloses a method for operating a heating or cooling system, whereby the temperature difference between supply temperature and return temperature or only the return temperature is controlled, so that hydraulic balancing of each heat exchanger of the heating or cooling system as achieved depending on temperature values. The balancing is newly adjusted and optimized at each changing of the operation conditions. Although a temperature difference between supply temperature and return temperature is used for control, there is neither a flow meter disclosed, nor the measurement of an energy flow through the heat exchanger, nor the determination of the functional dependency of the energy flow from the mass flow of the heating or cooling medium.

CN 220 686 350 A discloses a control method for real-time predicting self-adjusting temperature based on a BP neural network, a computer-readable storage medium, and an air conditioner, using an iterative process to predict the valve opening degree. The disclosure, however, does not teach constraining the degree of valve opening for maintaining energy-efficient thermal energy transfer.

CH 706 736 A1 discloses an efficiency control algorithm for maintaining energy efficient thermal energy transfer while operating a heat exchanger, however, does not disclose using recorded historical data.

CN 220 553353 A teaches a control method of an air conditioner which optimizes the energy efficient ratio of the air conditioner. While the disclosure mentions using current performance values, it does not mention maintaining energy-efficient thermal energy transfer.

CN 220 131 819B discloses an energy-saving air-conditioning system which includes a heat pump and a control device. A power with which to power the heat pump is calculated using historical data in combination with a weather forecast. The disclosure does not mention maintaining energy-efficient thermal energy transfer.

US 2015/268000 A1 discloses selectively modulating smart valves of an air handler unit, in particular modulating the amount of water that flows through a coil in an air handler unit. The disclosure focusses on improving the accuracy and stability of air temperature control, in particular by avoiding control oscillations, however an efficiency control algorithm for maintaining energy-efficient thermal energy transfer for the valves is not mentioned.

SUMMARY OF THE INVENTION

It is an object of this invention to provide a method, a control system, and a computer program product for controlling the orifice of a valve in an HVAC system, which method, control system, and computer program product do not have at least some of the disadvantages of the prior art. In particular, it is an object of the present invention to provide a method, a control system, and a computer program product for controlling the orifice of a valve in an HVAC system to regulate the flow of a fluid through a thermal energy exchanger of the HVAC system and to adjust the energy transfer by the thermal energy exchanger.

According to the present invention, these objects are achieved through the features of the independent claims. In addition, further advantageous embodiments follow from the dependent claims and the description.

According to the present invention, the above-mentioned objects are particularly achieved in that for controlling the orifice (or position or opening) of a valve in an HVAC system to regulate a flow of a primary fluid through a primary side of a thermal energy exchanger of the HVAC system and thereby adjust a thermal energy transfer by the thermal energy exchanger from the primary fluid to a secondary fluid, flowing through a secondary side of the thermal energy exchanger, one or more electronic circuits adjust the orifice of the valve by applying an efficiency control algorithm to a control setpoint for the valve. The efficiency control algorithm processes the control setpoint for the valve to maintain energy-efficient thermal energy transfer. The one or more electronic circuits further determine the control setpoint for the valve, using current performance values of the HVAC system and recorded historical data of the HVAC system.

In an embodiment, the one or more electronic circuits are configured to apply the efficiency control algorithm by processing the control setpoint for the value to maintain energy-efficient thermal energy transfer by avoiding saturation of the primary side of the thermal energy exchanger.

In an embodiment, the primary fluid is water. Depending on the embodiment, the primary fluid is a mixture of water and another substance, for example anti-freeze.

In an embodiment, the secondary fluid is air. In this embodiment the secondary fluid heats and/or cools a room or space by displacing air in the room or space.

In an embodiment, the secondary fluid is water, or a mixture of water and another substance, for example anti-freeze. In this embodiment, the secondary fluid heats and/or cools the room and or the space, for example through underfloor piping which provides heat to the room or absorbs heat from the room.

In an embodiment, the current performance values of the HVAC system include the current flow of the primary fluid, a current supply temperature of the primary fluid, and/or a current return temperature of the primary fluid. The recorded historical data of the HVAC system include for each of a plurality of past points in time the performance values of the HVAC system, measured at the respective point in time for the control setpoint of the valve at the respective point in time.

In an embodiment, the one or more electronic circuits implement a neural network for determining the control setpoint, using the current performance values of the HVAC system and the recorded historical data of the HVAC system.

In an embodiment, the one or more electronic circuits generate a performance model of the HVAC system, using the recorded historical data of the HVAC system, and determine the control setpoint for the valve, using the performance model of the HVAC system.

In an embodiment, the one or more electronic circuits implement a neural network for generating the performance model of the HVAC system.

In an embodiment, the one or more electronic circuits apply the efficiency control algorithm to the control setpoint for the valve by maintaining the control setpoint for the valve unchanged, if the control setpoint leads to operating the thermal energy exchanger in a zone of energy-efficient thermal energy transfer, where an increase in flow of the primary fluid leads to a defined minimum increase in the thermal energy transfer by the thermal energy exchanger, and altering the control setpoint for the valve to decrease the orifice of the valve, if the control setpoint does not lead to operating the thermal energy exchanger valve in the zone of energy-efficient thermal energy transfer.

In an embodiment, the one or more electronic circuits apply the efficiency control algorithm to the control setpoint for the valve by determining a control criterion, using a temperature difference between the current supply temperature of the primary fluid and the current return temperature of the primary fluid, and/or the current flow of the primary fluid. The one or more electronic circuits maintain the control setpoint for the valve unchanged, if the control criterion is at or above an efficiency threshold value, and alter the control setpoint for the valve to decrease the orifice of the valve, if the control criterion is below the efficiency threshold value.

In an embodiment, the one or more electronic circuits determine the control setpoint for the valve from an initial setpoint for the valve, whereby the initial setpoint for the valve comprises an initial valve position setpoint, an initial flow setpoint, an initial setpoint for a temperature difference between the current supply temperature of the primary fluid and the current return temperature of the primary fluid, or an initial power setpoint for the valve. The one or more electronic circuits determine the control setpoint for the valve by determining a defined valve position setpoint, a defined flow setpoint, a control setpoint for the temperature difference, or a defined power setpoint for the valve.

In an embodiment, the one or more electronic circuits are configured to determine control setpoints including one or more of: a defined supply temperature of the primary fluid, a defined mixing valve setpoint of a mixing circuit of the primary fluid, a defined temperature setpoint of the supply air, or a defined humidity setpoint of the supply air.

In an embodiment, the recorded historical data of the HVAC system for the respective past points in time, further comprise a flow of the secondary fluid, an input temperature of the secondary fluid entering the secondary side of the thermal energy exchanger, an output temperature of the secondary fluid exiting the secondary side of the thermal energy exchanger, electrical power consumption of an HVAC component of the HVAC system, electrical power consumption of the thermal energy exchanger, a pumping speed of a pump driving the primary fluid through the primary side of a thermal energy exchanger, electrical power consumption of the pump, a fan speed of a fan driving the secondary fluid through the secondary side of a thermal energy exchanger, electrical power consumption of the fan, a humidity level of the secondary fluid, and/or weather data related to an area where the HVAC system as located.

In an embodiment, the one or more electronic circuits determine a pump set point for a pump driving the primary fluid through the primary side of the thermal energy exchanger, and/or a fan setpoint for a fan driving the secondary fluid through the secondary side of the thermal energy exchanger, using the current performance values of the HVAC system and the recorded historical data of the HVAC system.

In an embodiment, the performance data of the HVAC system are recorded and stored in a cloud-based computer system remote from the HVAC system, and the control setpoint for the valve is determined at least partially by one or more circuit arranged in the cloud-based computer system.

In addition to the method of controlling the orifice of a valve in an HVAC system, the present invention also relates to a control system for controlling an orifice of a valve in an HVAC system to regulate a flow of a primary fluid through a primary side of a thermal energy exchanger of the HVAC system and thereby adjust a thermal energy transfer by the thermal energy exchanger from the primary fluid to a secondary fluid, flowing through a secondary side of the thermal energy exchanger. The system comprises one or more electronic circuits configured to adjust the orifice of the valve by applying an efficiency control algorithm to a control setpoint for the valve, the efficiency control algorithm processing the control setpoint for the valve to maintain energy-efficient thermal energy transfer. The one or more electronic circuits are further configured to determine the control setpoint for the valve, using current performance values of the HVAC system and recorded historical data of the HVAC system.

In an embodiment, the efficiency control algorithm processes the control setpoint for the value to maintain energy-efficient thermal energy transfer by avoiding saturation of the primary side of the thermal energy exchanger.

In an embodiment, the current performance values of the HVAC system include the current flow of the primary fluid, a current supply temperature of the primary fluid, and/or a current return temperature of the primary fluid; and the recorded historical data of the HVAC system include for each of a plurality of past points in time the performance values of the HVAC system, measured at the respective point in time for the setpoint of the valve at the respective point in time.

In an embodiment, the one or more electronic circuits are further configured to implement a neural network for determining the control setpoint for the valve, using the current performance values of the HVAC system and the recorded historical data of the HVAC system.

In an embodiment, the one or more electronic circuits are further configured to generate a performance model of the HVAC system, using the recorded historical data of the HVAC system; and determine the control setpoint for the valve, using the performance model of the HVAC system.

In an embodiment, the one or more electronic circuits are further configured to implement a neural network for generating the performance model of the HVAC system.

In an embodiment, the one or more electronic circuits are configured to apply the efficiency control algorithm to the control setpoint for the valve by maintaining the control setpoint for the valve unchanged, if the control setpoint leads to operating the thermal energy exchanger in a zone of energy-efficient thermal energy transfer, where an increase in flow of the primary fluid leads to a defined minimum increase in the thermal energy transfer by the thermal energy exchanger, and altering the control setpoint for the valve to decrease the orifice of the valve, if the control setpoint does not lead to operating the thermal energy exchanger valve in the zone of energy-efficient thermal energy transfer.

In an embodiment, the one or more electronic circuits are configured to apply the efficiency control algorithm to the control setpoint for the valve by determining a control criterion, using at least one of: a temperature difference between the current supply temperature of the primary fluid and the current return temperature of the primary fluid, or the current flow of the primary fluid; maintain the control setpoint for the valve unchanged, if the control criterion is at or above an efficiency threshold value, and alter the control setpoint for the valve to decrease the orifice of the valve, if the control criterion is below the efficiency threshold value.

In an embodiment, the one or more electronic circuits are configured to determine the control setpoint for the valve from an initial setpoint for the valve, whereby the initial setpoint for the valve comprises an initial valve position setpoint, an initial flow setpoint, an initial setpoint for a temperature difference between the current supply temperature of the primary fluid and the current return temperature of the primary fluid, or an initial power setpoint for the valve; and to determine the control setpoint for the valve by determining a defined valve position setpoint, a defined flow setpoint, a control setpoint for the temperature difference, or a defined power setpoint for the valve.

In an embodiment, the recorded historical data of the HVAC system for the respective past points in time, further comprise a flow of the secondary fluid, an input temperature of the secondary fluid entering the secondary side of the thermal energy exchanger, an output temperature of the secondary fluid exiting the secondary side of the thermal energy exchanger, electrical power consumption of an HVAC component of the HVAC system, electrical power consumption of the thermal energy exchanger, a pumping speed of a pump driving the primary fluid through the primary side of a thermal energy exchanger, electrical power consumption of the pump, a fan speed of a fan driving the secondary fluid through the secondary side of a thermal energy exchanger, electrical power consumption of the fan, a humidity level of the secondary fluid, and/or weather data related to an area where the HVAC system as located.

In an embodiment, the one or more electronic circuits are further configured to determine a pump set point for a pump driving the primary fluid through the primary side of the thermal energy exchanger, and/or a fan setpoint for a fan driving the secondary fluid through the secondary side of the thermal energy exchanger, using the current performance values of the HVAC system and the recorded historical data of the HVAC system.

In an embodiment, at least some of the one or more electronic circuits are arranged in a cloud-based computer system remote from the HVAC system and configured to record and store the performance data of the HVAC system an the cloud-based computer system; and the one or more electronic circuits are configured to determine the control setpoint for the valve at least partially in the cloud-based computer system.

In addition to the method and computer system, the present invention also relates to a computer program product comprising a non-transitory computer readable-medium having stored thereon computer program code configured to control a processor of a control system to perform a method of controlling an orifice of a valve in an HVAC system to regulate a flow of a primary fluid through a primary side of a thermal energy exchanger of the HVAC system and thereby adjust a thermal energy transfer by the thermal energy exchanger from the primary fluid to a secondary fluid flowing through a secondary side of the thermal energy exchanger. The computer program code is further configured to control the processor of the control system to adjust the orifice of the valve by applying an efficiency control algorithm to a control setpoint for the valve, the efficiency control algorithm processing the control setpoint for the valve to maintain energy-efficient thermal energy transfer; and to determine the control setpoint for the valve, using current performance values of the HVAC system and recorded historical data of the HVAC system.

BRIEF DESCRIPTION OF THE DRAWINGS

The present invention will be explained in more detail, byway of example, with reference to the drawings in which.

DETAILED DESCRIPTION OF THE PREFERRED EMBODIMENTS

Figure 1:
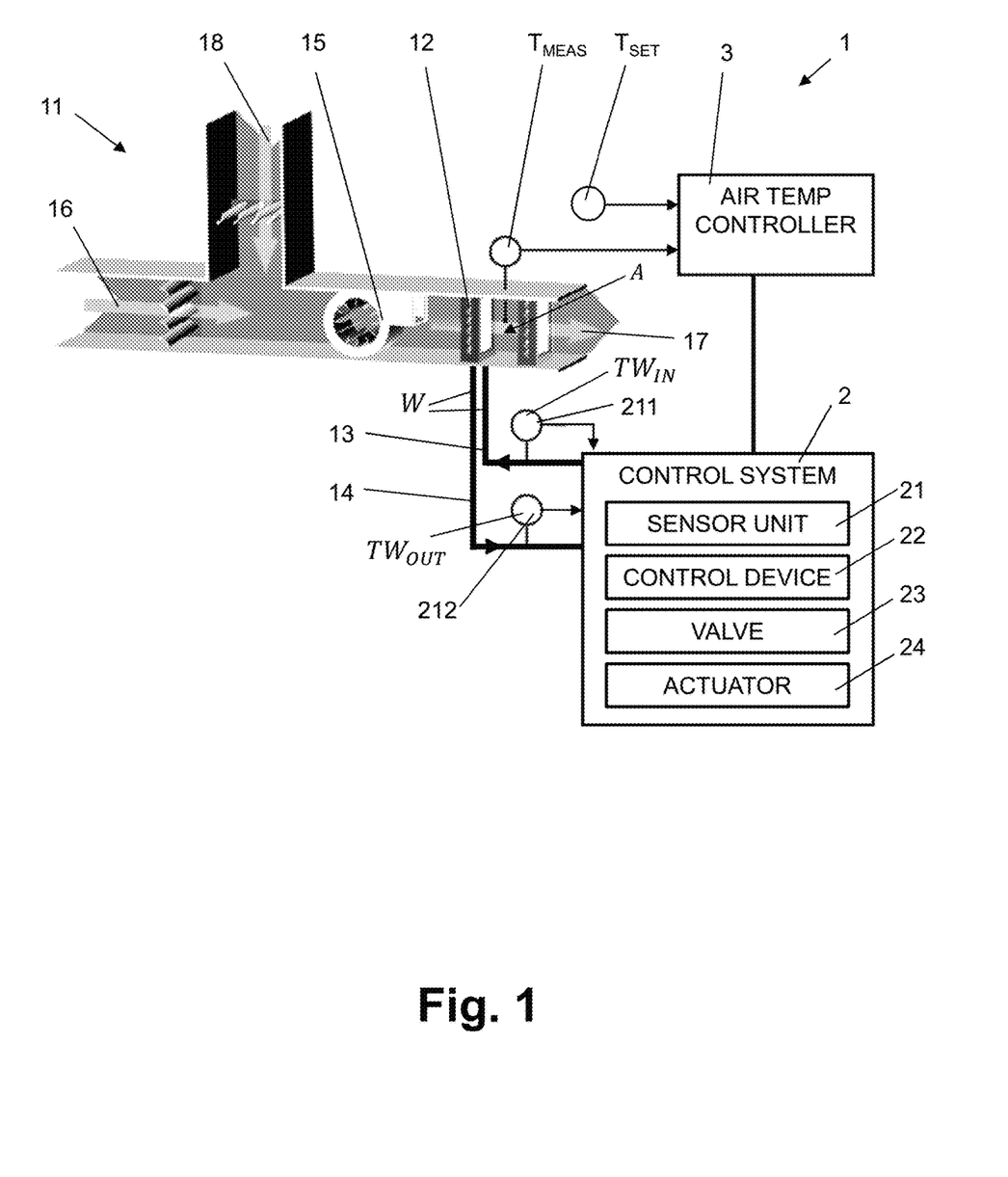
FIG. 1: shows a diagram illustrating schematically an HVAC system.

In FIG. 1, reference numeral 1 relates to a heating, ventilation, and air conditioning (HVAC) system. The HVAC system 1 is installed in a building and is used to provide climate controlled air for the building, in particular by delivering climate controlled into one or more rooms. The HVAC system 1 comprises various components including electronic devices. The HVAC system 1 comprises a control system 2, which senses, and controls the flow of, a primary fluid W through a primary side of a thermal energy exchanger 12. The primary fluid W is largely comprised of water. In an embodiment, the primary fluid W is a binary mixture of water and anti-freeze solution, the anti-freeze solution preferably being glycol. The control system 2 senses a temperature of the primary fluid W using a sensor unit 21. The sensor unit 21 comprises a supply temperature sensor 211 which measures a current supply temperature $TW_{IN}$ of the primary fluid W flowing into the thermal energy exchanger 12, and a return temperature sensor 212 which measures a current return temperature $TW_{OUT}$ of the primary fluid W flowing out of the thermal energy exchanger 12. In an embodiment, the control system 2 further senses a current flow rate $\Phi W$ of the primary fluid W using the sensor unit 21. Specifically, the sensor unit 21 of the control system 2 comprises a flow meter 213 (not shown) configured to measure the current flow rate $\Phi W$ of the primary fluid W using the sensor unit 21. The control system 2 further comprises a valve 23 which regulates the current flow rate $\Phi W$ of the primary fluid W by the opening and closing of an (orifice) of the valve 23 to allow the primary fluid W to flow at a greater and lesser rate, respectively. The control system 2 further comprises an actuator 24 connected to the valve 23 configured to control the opening and closing of the valve 23, depending on an applied control signal, for adjusting the orifice of the valve 23 and thus the flow of primary fluid W. The control system 2 further comprises a control device 22 which is connected to the sensor unit 21 and the actuator 24 and is configured to control the actuator 24 using data provided by the sensor unit 21, as explained in more detail below with regards to FIG. 4.

In an embodiment, the valve 23, actuator 24, and flow meter 213 are integrated in a fluid flow controller. The benefits of integrating these devices include a more accurate and responsive control of the primary fluid W.

The control system 2 is connected to the thermal energy exchanger 12 by pipes which transport the primary fluid W. In particular, the control system 2 is connected to the thermal energy exchanger 12 by a fluid supply pipe 13 in which the primary fluid W travels to the thermal energy exchanger 12. The current supply temperature sensor is installed on or in the fluid supply pipe 13. The control system 2 is also connected to the thermal energy exchanger 12 by a fluid return pipe 14 in which the primary fluid W is returned from the thermal energy exchanger 12.

The thermal energy exchanger 12 is a device configured to transfer thermal energy between the primary fluid W and a secondary fluid A. Depending on the application and configuration, the thermal energy exchanger 12 comprises a heat exchanger or a chiller, for example. The secondary fluid A is air used for heating and/or cooling the building, in particular a room of the building. The secondary fluid A is driven through the thermal energy exchanger 12 by a fan 15.

In an embodiment, the secondary fluid A moves through the thermal energy exchanger 12 passively, i.e. due to wind or convective forces. The thermal energy exchanger 12 provides energy to the secondary fluid A, if the temperature of the primary fluid W is greater than the temperature of the secondary fluid A and in this case acts as a heater. The thermal energy exchanger 12 draws energy from the secondary fluid A if the temperature of the primary fluid W is less than the temperature of the secondary fluid A and in this case acts as a cooler.

The thermal energy exchanger 12 and fan 15 are arranged in an air duct 11. The air duct is designed such that the fan 15 draws in upstream supply air 16 and return air 18 and drives air through the thermal energy exchanger 12. The air-conditioned air 17 then flows downstream through the air duct 11 and into the building, more specifically into one or more rooms of the building.

The HVAC system 1 comprises an air temperature controller 3. The air temperature controller 3 is connected to the control system 2, either with a wired connection or a wireless connection. The air temperature controller 3 comprises a downstream air temperature sensor 31 (shown in FIG. 3) configured to measure a downstream air temperature of the air after the air has passed through the thermal energy exchanger 12. In particular, the air temperature sensor is arranged in the air duct 11 downstream from the thermal energy exchanger 12. The air temperature controller 3 is configured to receive, from the air temperature sensor, a current air temperature $T_{MEAS}$. The air temperature controller 3 is configured to receive an air temperature setpoint $T_{SET}$. The air temperature controller 3 is configured to transmit the current air temperature $T_{MEAS}$ and the air temperature setpoint $T_{SET}$ to the control system 2. In an embodiment, the air temperature controller 3 is configured to determine a temperature control signal using the current air temperature $T_{MEAS}$ and the air temperature setpoint $T_{SET}$ and transmit the temperature control signal (variable) to the control system 2.

Figure 2:
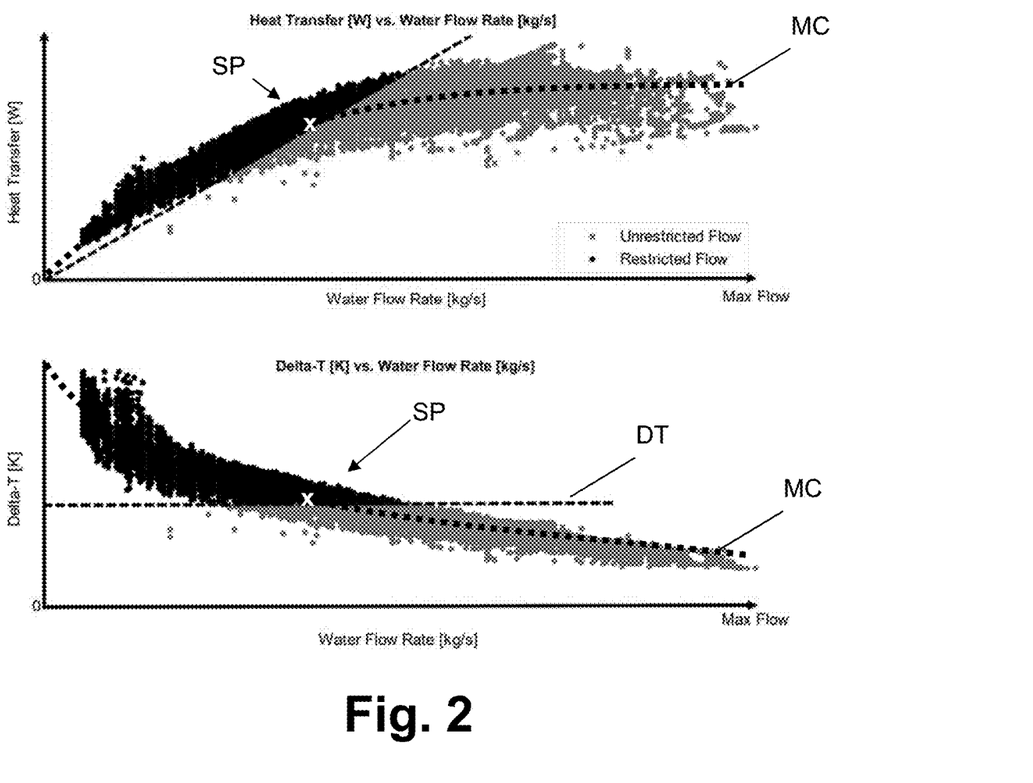
FIG. 2: shows two scatter plots, the first showing relationships between heat transfer and water flow rate for multiple operating conditions of a heat exchanger and the second showing relationships between delta-T and water flow rate for multiple operating conditions of the heat exchanger.

FIG. 2 shows a top scatter plot showing relationships between heat transfer measured in Watts on the y axis, and water flow rate measured in kg/s on the x-axis for the heat exchanger 12 and various operating conditions O thereof. In particular, the heat transfer from the primary fluid W, specifically water, to the secondary fluid A, specifically air, through the thermal energy exchanger 12 is shown as a function of the current flow rate ΦW, specifically the water flow rate, for multiple operating conditions O of the heat exchanger 12. Each dot on the scatter plot represents the heat transfer of the thermal energy exchanger 12 at particular operating conditions O and water flow rate. The mean curve MC shows an average response. It can be seen that increasing the water flow rate increases the heat transfer. However, the behaviour is nonlinear. As the water flow rate continues to increase, the commensurate increase in heat transfer steadily reduces. In fact, a levelling off can be seen such that at very high water flow rates, increasing the water flow rate further results in little increase in the heat transfer. This thermal energy exchanger 12 is said to be operating at saturation once the levelling off occurs. Saturation occurs when the thermal energy exchanger 12 has reached a state such that further increasing the water flow rate does not result in significantly greater heat transfer. Depending on the embodiment, the point at which saturation occurs is defined differently. For instance, the saturation point SP can be calculated as a percentage of the heat transferred by the thermal energy exchanger 12 at a maximum water flow rate. For illustrative purposes, in the top scatter plot the saturation point SP is defined as 85% of the maximum heat transferred for an average thermal energy exchanger 12 which has a response curve as defined by the mean curve MC. It can further be seen that, by extending a line through the origin and the saturation point SP lying on the mean curve MC, the dots of the top scatter plot are divided into two regimes corresponding to unrestricted flow, marked as black dots, and restricted flow, marked as grey dots. The saturation point SP defines both the heat transfer and a corresponding water flow rate required to achieve such a heat transfer for a thermal energy exchanger 12 of an HVAC system 1 lying on the mean curve MC. This saturation point SP can be used to control the thermal energy exchanger 12 of any HVAC system 1. However, this is not optimal, as this saturation point SP is independent of the operating conditions O, and therefore is, strictly speaking, valid only for a particular set of operating conditions O which cause the thermal energy exchanger 12 to lie on the mean curve MC. Therefore, for some operating conditions O which do not cause the thermal energy exchanger 12 to lie on the mean curve MC, the thermal heat exchanger 12 when controlled such that it does not reach the saturation point SP, as defined by the mean curve MC, will actually already be operating in saturation, i.e. at a water flow rate above the water flow rate defined by the saturation point SP. Similarly, there will be some operating conditions O which do not cause the thermal energy exchanger 12 to reach the saturation point SP, i.e. below the water flow rate as defined by the saturation point SP. In the former case this results in an efficiency lower than intended, and in the latter case this results in an energy exchanger 12 limited in its heat transfer capabilities.

The bottom scatter plot of FIG. 2 is similar to the top scatter plot in that it shows a plurality of measurement points of the heat exchanger 12 of HVAC systems a operating at different operating conditions O and water flow rates. In the bottom scatter plot, however, delta-T in degrees Kelvin is plotted against water flow rate in kg/s, delta-T being the difference between the current supply temperature temperature $TW_{IN}$ of the primary fluid W, and the current return temperature $TW_{OUT}$ of the primary fluid W. At low water flow rates, the water moves slowly enough through the thermal energy exchanger 12 that the difference between the current supply temperature temperature $TW_{IN}$ and the current return temperature $TW_{OUT}$ is large, as there is sufficient time for heat to transfer from the primary fluid W to the secondary fluid A moving through the thermal energy exchanger 12. It can be seen in the bottom scatter plot that as the water flow rate increases, delta-T decreases. This is because the primary fluid W remains in the thermal energy exchanger 12 for less time, allowing less heat to flow from the primary fluid W to the secondary fluid A. The relationship is non-linear, such that for constant increases in the water flow rate, the commensurate decrease in delta-T grows ever smaller. The mean curve MC, representing the average relationship between delta-T and water flow rate is also plotted on the bottom scatter plot. Therefore, a saturation point SP for the bottom scatter plot can also be defined as a minimum value of Delta-T (which also defines a maximum water flow rate), below which the thermal energy exchanger 12 is operating inefficiently. By using this definition of delta-T, which has, for example, a value of 10 degrees Kelvin, a given thermal energy exchanger 12 can be controlled such that the delta-T does not fall below the defined saturation point SP. However, it can be seen that, for the plurality of operating conditions O of the thermal energy exchanger 12 plotted on the bottom scatter plot, at some operating conditions O comparatively little water flow rate is required to achieve the minimum delta-T, while at other operating conditions require a very high water flow rate to achieve the same minimum delta-T as defined by the saturation point SP. In the former cases the thermal energy exchanger 12 is operating efficiently, while in the latter cases the thermal energy exchanger 12 is no longer operating efficiently.

In general, additional heat can be transferred from the water to the air by operating the thermal energy exchanger 12 above the saturation point SP, the additional energy by the pump to drive the water through the pipes and the thermal energy exchanger 12 results in a lowered overall efficiency of the HVAC System 1.

Figure 3:
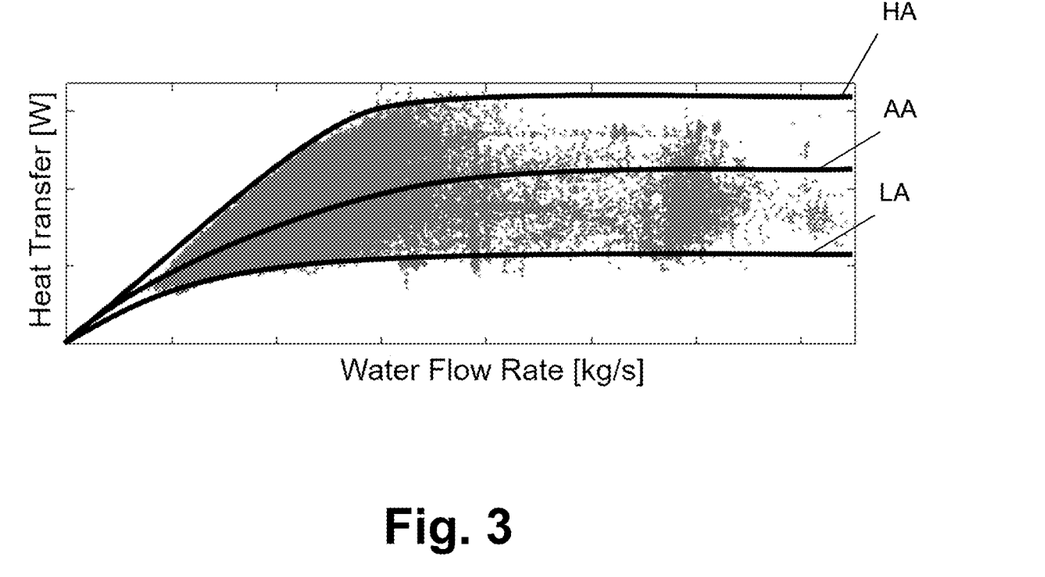
FIG. 3: shows a scatter plot of heat transfer vs. water flow rate for multiple operating conditions of an HVAC system.

FIG. 3 shows a scatter plot of the relationship between heat transfer in Watts and water flow rate in kg/s for a thermal heat exchanger 12 of a HVAC system 1 operating under many different operating conditions O. In particular, the thermal heat exchanger 12 was operated under different airflow conditions, meaning that the flow rate of the secondary fluid A through the heat exchangers 12 was not the same for all heat exchangers 12. Three curves are superimposed on the scatter plot points, which indicate high airflow HA, average airflow AA, and low airflow LA, respectively. It can be seen that when the thermal energy exchanger 12 is exposed to operating conditions O including a high airflow HA, more thermal energy is transferred than when exposed to a low airflow LA. It can also be seen that, depending on airflow conditions, there is a different water flow rate for which heat transfer no longer steadily increases, i.e. the water flow rate at which the thermal energy exchanger 12 transitions from operating in an efficient regime to operating in an inefficient regime (the so-called "waste zone"). In particular, the thermal energy exchanger 12 reaches saturation at a lower water flow rate under low airflow LA conditions, and the thermal energy exchanger 12 reaches saturation at a higher water flow rate under high airflow HA conditions. The heat transfer is also dependent on the air humidity. It should be noted that the saturation point SP is a specific demarcation point at which the thermal energy exchanger 12 is defined to transition from operating in an efficient regime to operating in an inefficient regime. The saturation point SP lies in a transition zone in which the thermal energy transfer of the thermal energy exchanger 12 levels off.

Figure 4:
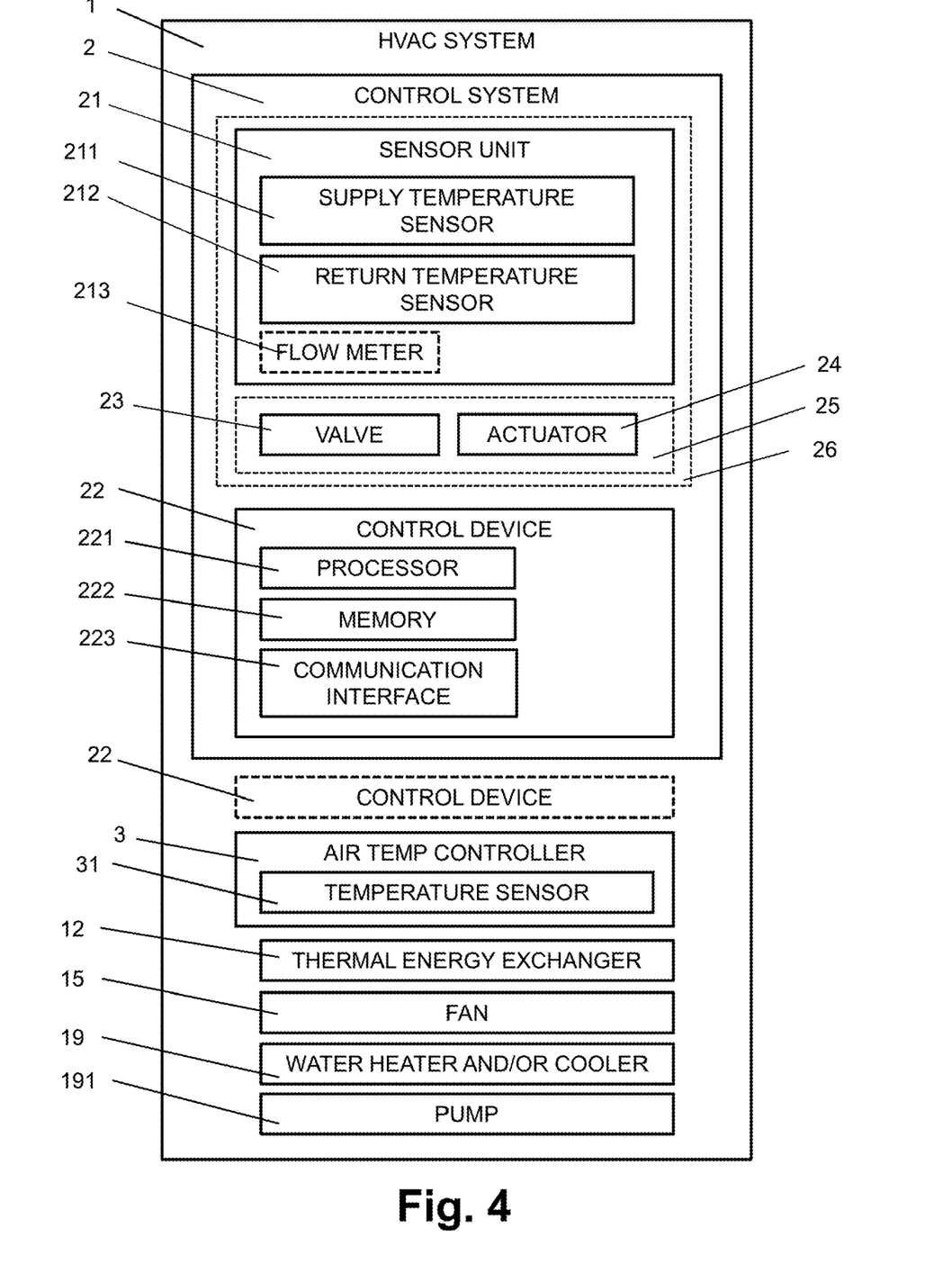
FIG. 4: shows a block diagram illustrating schematically an HVAC system.

FIG. 4 shows a block diagram illustrating schematically the HVAC system 1. This Figure shows various components of and how they are grouped together. The control system 2, as introduced in FIG. 1, comprises the sensor unit 21, the control device 22, the valve 23 and the actuator 24. These various components may be arranged together in various configurations, for example the valve 23 and the actuator 24 are, in an embodiment, arranged in an electromechanical valve 25, such as an electronic motor driven valve or a solenoid valve. The valve 23, the actuator 24, and the control system 2 are also, in an embodiment, arranged together in a single sensing valve 26, which combines sensing and actuating capabilities. The sensor unit 2 comprises the supply temperature sensor 211 and the return temperature sensor 212. in an embodiment, further comprises a flow meter 213.

The control device 22 is arranged as part of the control system 2 and comprises an electronic circuit, including a processor 221, a memory 222, and a communication interface 223.

Depending on the particular embodiment, the components of the control device 22 are arranged throughout the HVAC system 1. For example, in an embodiment, the control device 22 is arranged in the HVAC system 1 separate to the control system 2. In an embodiment, the control system 2 is arranged external to the HVAC system 1 and is connected to the HVAC system 1 by a connection line.

The components of the control device 22 are interconnected using a connection line. The control device 22, and components thereof, are connected to the control system 2 and components thereof, including in particular the sensor unit 21 and the actuator 24. The control device 22 is also connected to other components and modules of the HVAC system 1, in particular the air temperature controller 3, using the connection line. In an embodiment, the air temperature controller 3 is arranged as part of the control system 2. The air temperature controller comprises the downstream temperature sensor 31, arranged to measure the downstream air temperature of the air after the air has passed through the thermal energy exchanger 12. In an embodiment, the air temperature controller comprises an upstream temperature sensor, arranged to measure an upstream air temperature of the air before the air has passed through the thermal energy exchanger 12. The air temperature controller is configured to calculate a temperature difference across the thermal energy exchanger 12 using the upstream air temperature and the downstream air temperature. The communication interface 223 is configured to receive input setpoints IS. The input setpoints IS comprise, for example, the air temperature setpoint $T_{SET}$. In an embodiment, the control system 2 comprises a HMI (human machine interface) configured to receive the input setpoints IS. In an embodiment, the HMI is separate from the control system 2 and is, for example, integrated into the air temperature controller 3. In an embodiment, the control system 2 receives the input setpoints IS from an external computing device, for example a mobile phone, a gateway device, or a cloud-based computer system 10 (not shown).

The term connection line relates to means which facilitate power transmission and/or data communication between two or more modules, devices, systems, or other entities. The connection line is a wired connection across a cable or system bus, or a wireless connection using direct or indirect wireless transmissions. For example, the connection line includes, depending the embodiment, a BACnet, Modbus, SPI, $I_2C$, or other communication protocol or standard. For example, the connection line includes, depending on the embodiment, Bluetooth, ANT+, WLAN, or other wireless digital communication protocols. The data communication is implemented as an analog communication or a digital communication, depending on the embodiment and the communicating modules. In an embodiment, the data communication takes place using a digital bus. The connection line comprises, depending on the embodiment, communication interfaces or communication modules of particular modules, devices, systems, or other connected entities. Depending on the embodiment, the connection line comprises communication networks, such as controller area networks, local area networks and/or the Internet.

For example, in an embodiment a wired connection facilitates data transmission using an analog signal, for example an applied voltage on a signal line of a wired connection between the control device 22 and the actuator 24 is used to control the actuator 24. Similarly, in an embodiment a sensor of the sensor unit 21, such as the supply temperature sensor 221, is configured to provide a temperature signal dependent on voltage drop across the sensor, or equivalently as a resistance, which voltage drop or resistance varies according to the temperature, respectively.

The processor 221 comprises a central processing unit (CPU) for executing computer program code stored in the memory. The processor 221, in an example, includes more specific processing units such as application specific integrated circuits (ASICs), reprogrammable processing units such as field programmable gate arrays (FPGAs), or processing units specifically configured to accelerate certain applications. The memory 222 comprises one or more volatile (transitory) and or non-volatile (non-transitory) storage components. The storage components are removable and/or non-removable, and are also integrated, in whole or in part with the control device 22. Examples of storage components include RAM (Random Access Memory), flash memory, hard disks, data memory, and/or other data stores. The memory 222 has stored thereon computer program code configured to control the processor 222 of the control device 22, such that the control device 22, more generally the control system 2, more generally the HVAC system 1, performs one or more steps and/or functions as described herein.

Depending on the embodiment, the computer program code is compiled or non-compiled program logic and/or machine code. As such, the control device 22 is configured to perform one or more steps and/or functions. The computer program code defines and/or is part of a discrete software application. One skilled in the art will understand, that the computer program code can also be distributed across a plurality of software applications. The software application is installed in the control device 22. Alternatively, the computer program code can also be retrieved and executed by the control device 22 on demand. In an embodiment, the computer program code further provides interfaces, such as APIs (Application Programming Interfaces), such that functionality and/or data of the control device 22 is accessed remotely, such as via a client application or via a web browser. In an embodiment, the computer program code is configured such that one or more steps and/or functions are not performed in the control device 22 but in the external computing device, for example the mobile phone, and/or a remote server at a different location to the control device 22, for example in the cloud-based computer system 10 (not shown).

In an embodiment, the processor 221 and the memory 222 are arranged in the same integrated circuit, for example in a microcontroller. The communication interface 223 is connected to the processor 221 using the connection line such as a bus, for example a BACnet and/or Modbus interface, and enables wireless and/or wired communication using one or more communication standards and/or protocols.

Depending on the embodiment, the HVAC system 1 comprises water heater and/or a water cooler 29 and a pump 191 configured to pump water through the HVAC system 1, in particular through the water heater and/or cooler 19, the control system 2, and the thermal energy exchanger 12.

In the following paragraphs, described with reference to FIGS. 5 to 10, are possible sequences of steps performed by the processor 221 of the control system 2 for controlling the orifice (opening or position) of the valve 23 to regulate the flow ΦW of a primary fluid W through the primary side of the thermal energy exchanger 12 of the HVAC system 1 and thereby adjust the thermal energy transfer by the thermal energy exchanger 12 from the primary fluid W to the secondary fluid A, flowing through the secondary side of the thermal energy exchanger 12.

Figure 5:
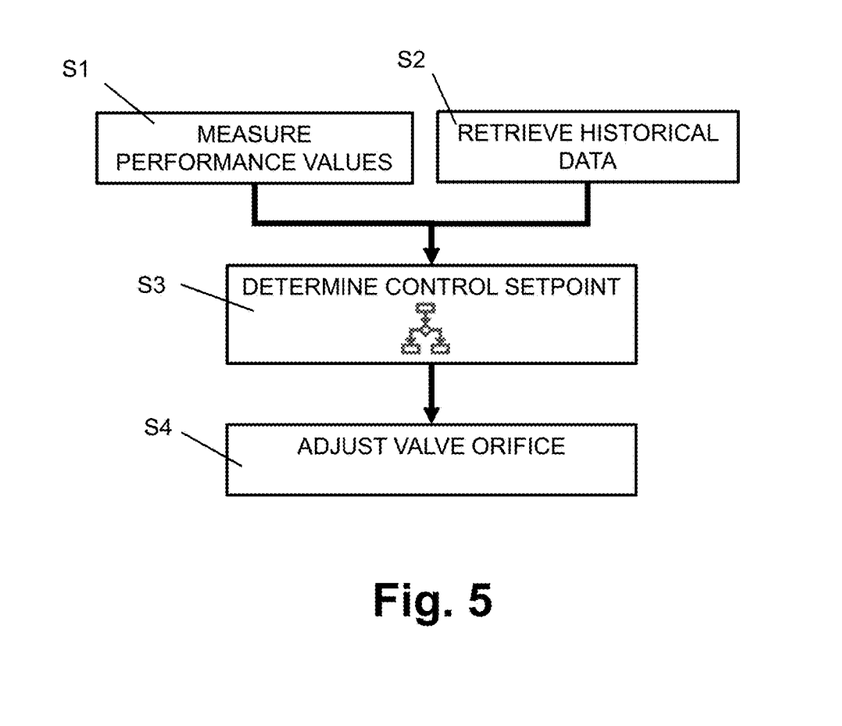
FIG. 5: shows a flow diagram illustrating an exemplary sequence of steps for controlling the orifice (opening) of a valve of an HVAC system.

FIG. 5 shows a series of steps for adjusting the valve orifice. In step S1, the control system 2 measures performance values V of the HVAC system 1. The performance values V comprise sensor data from the sensor unit 2 integrated into the HVAC system 1 and/or external to the HVAC system 1. In particular, the performance values V comprise properties of the primary fluid W, including the current supply temperature $TW_{IN}$, the current return temperature $TW_{OUT}$, and/or the current flow rate ΦW.

In an embodiment, the performance values V also comprise properties of the secondary fluid A, including the air temperature upstream and/or the air temperature downstream of the thermal energy exchanger 12, as measured by the air temperature controller 3, for example. The air temperature downstream from the thermal energy exchanger 12 is, depending on the embodiment, measured in one or more places, including in the air duct 11, directly downstream from the thermal energy exchanger 12, and/or in rooms of the building in which the HVAC system 1 is installed.

In step S2, the control system 2 retrieves historical data D of the HVAC system 1. The historical data D is retrieved from the memory 222. In an embodiment, the historical data D is retrieved, at least in part, from the external computing device. The historical data D comprises performance values V of the HVAC system 1 at a plurality of points in time in the past, as well as control setpoints S at a plurality of time points in the past. The control setpoints S are a set of actuator signals used by the control system 2 to control the HVAC system 1. Specifically, the control setpoints S comprise a flow rate setpoint used by the control system 2 to control the flow rate of the primary fluid W. In particular, the control setpoint S is determined by the processor 222 of the control device 22, and the actuator 24 is configured to control the orifice of the valve 23 to regulate the flow rate of the primary fluid W, depending on the control setpoint S. For example, the control setpoint S is transmitted from the control device 2 to the actuator 24 as an electronic message using the connection line. Depending on the embodiment, the control setpoint S comprises a defined valve position setpoint of the valve 23, a control setpoint for the temperature difference, a position setpoint for the actuator 24, a defined power setpoint of the actuator 24, a power setpoint of the thermal energy exchanger 22, and/or a defined flow setpoint of the flow rate ΦW of the primary fluid W.

In an embodiment, the control setpoint S for the valve 23 is determined by the processor using an initial setpoint for the valve 23, the initial setpoint for the valve 23 comprising an initial valve position setpoint, an initial flow setpoint, an initial setpoint for a temperature difference $\Delta TW = TW_{IN} - TW_{OUT}$ between the current supply temperature $TW_{IN}$ and the current return temperature $TW_{OUT}$ of the primary fluid W, and/or an initial power setpoint for the valve 23.

In step S3, the control system 2 uses the performance values V and the historical data D and, using an efficiency control algorithm, determines the control setpoint S. The efficiency control algorithm includes, depending on the embodiment, one or more models, programs, functions, and/or processes. The efficiency control algorithm is configured such that the processor 221 determines, using the performance values V and the historical data D, the transition zone for the particular HVAC system 1, specifically the transition zone for the thermal energy exchanger 12. The thermal energy exchanger 12 is said to operate in the transition zone when the heat transfer of the thermal energy exchanger 12 begins to level off with increasing flow rate of the primary fluid W.

In an embodiment, the efficiency control algorithm is configured such that the processor 222 determines, using the performance values V and the historical data D, a saturation point SP for the particular HVAC system 1, specifically a saturation point SP for the thermal energy exchanger 12, which saturation point SP lies in the transition zone. As shown for example in the bottom scatter plot of FIG. 2, the saturation point SP relates to a value of delta-T and a value of the water flow rate. The thermal energy exchanger 12 is said to operate beyond the saturation point SP if the delta-T, as measured using the current supply temperature $TW_{IN}$ and the current return temperature $TW_{OUT}$, is less than the value of delta-T of the saturation point SP. While in FIG. 2 the saturation point SP is indicated for a thermal energy exchanger 12 lying on the mean curve MC, in general each thermal energy exchanger 12 has a different saturation point SP, and depending on the operating conditions O of the thermal energy exchanger 12, the saturation point SP is different. Therefore, a given thermal energy exchanger 12 does not necessarily have the same saturation point SP as another thermal energy exchanger 12, or even as the same given thermal energy exchanger 12 at a different point in time. The saturation point SP for a given thermal energy exchanger 12 varies over time due to changing operating conditions O, both internal to the HVAC system 1, such as the temperature of the primary fluid W, and external, such as air temperature upstream of the thermal energy exchanger 12, which may be drawn in from outside. The aging of the HVAC system 1 which, for example, can cause increased friction loss in the fluid flow (both primary fluid W and secondary fluid A) through the HVAC system 1, is also considered an operating condition O. The efficiency control algorithm is therefore configured such that the processor 221 dynamically generates, using the current performance values V of the HVAC system 1, along with the historical data D, the saturation point SP.

The efficiency control algorithm is configured such that the processor 222 sets the orifice of the valve 23 once the thermal energy exchanger 12 enters the transition zone to maintain energy efficient operation. In particular, the efficiency control algorithm is configured such that the processor 221 sets the orifice of the valve 23 such that the current flow rate ΦW of the primary fluid W does not result in the thermal energy exchanger 12 exceeding the saturation point SP. This results in an HVAC system 1 whose thermal energy exchanger 12 dynamically adjusts, using the efficiency control algorithm, the determined saturation point SP, and therefore a determined minimum delta-T and a corresponding determined maximum current flow rate ΦW of the primary fluid W, such that energy efficient operation is ensured. The efficiency control program is configured such that, in step S4, the processor 222 determines the control setpoint S of the valve 23. In particular, the control setpoint S is received by the actuator 24 which adjusts the orifice of the valve 23 accordingly. For example, the control setpoint S is determined by the processor 222 such that it does not result in a flow rate ΦW of the primary fluid W which exceeds the flow rate as indicated by the saturation point SP. In another example, the control setpoint S is determined by the processor 222 such that it does not result in a delta-T which is below the delta-T as indicated by the saturation point SP.

In an embodiment, the control system 2 receives the input setpoints IS comprising the air temperature setpoint $T_{SET}$ indicating a requested air temperature higher than the current air temperature. The control system 2 is configured to increase the temperature of a room heated by the secondary fluid A. The processor 221 is configured to determine the control setpoint S, further using the input setpoints IS, such that the thermal energy exchanger 12 remains in an energy-efficient regime and does not enter the waste zone, where a comparatively large amount of pumping power is required to produce a comparatively small increase in heat transfer from the primary fluid W to the secondary fluid A. In an example, the control setpoint S is maintained unchanged, if the control setpoint S would result in operating the thermal energy exchanger 12 in a zone of energy-efficient thermal energy transfer, where an increase in the flow rate ΦW of the primary fluid W would lead to a defined minimum increase in the thermal energy transfer by the thermal energy exchanger 12. Further, the control setpoint S for the valve 23 is adjusted to decrease the orifice of the valve 23, if the control setpoint S does not lead to operating the thermal energy exchanger 12 in the zone of energy-efficient thermal energy transfer.

In an embodiment, if the efficiency control algorithm determines that the thermal energy exchanger 12 is operating beyond the saturation point SP, then the control setpoints S are adjusted from their current values until the saturation point SP is reached. In particular, the orifice of the valve 23 is closed, a pump set point for the pump 292 is reduced, a pumping speed of the pump 292 is reduced and/or a pump power of the pump 292 is reduced, to lower the flow rate of the primary fluid W.

Depending on the embodiment, the control setpoints S comprise a water heater and/or cooler setpoint, indicating a temperature of the primary fluid W and/or a power of the water heater and/or cooler 29. The control setpoints S further comprise, in an example, the pump setpoint for the pump 292 and/or a fan speed of the fan 15.

The control device 22, in particular the processor 221, is configured to record the current performance values V, along with the current control setpoint S, in the memory 222 as historical data D.

Figure 6:
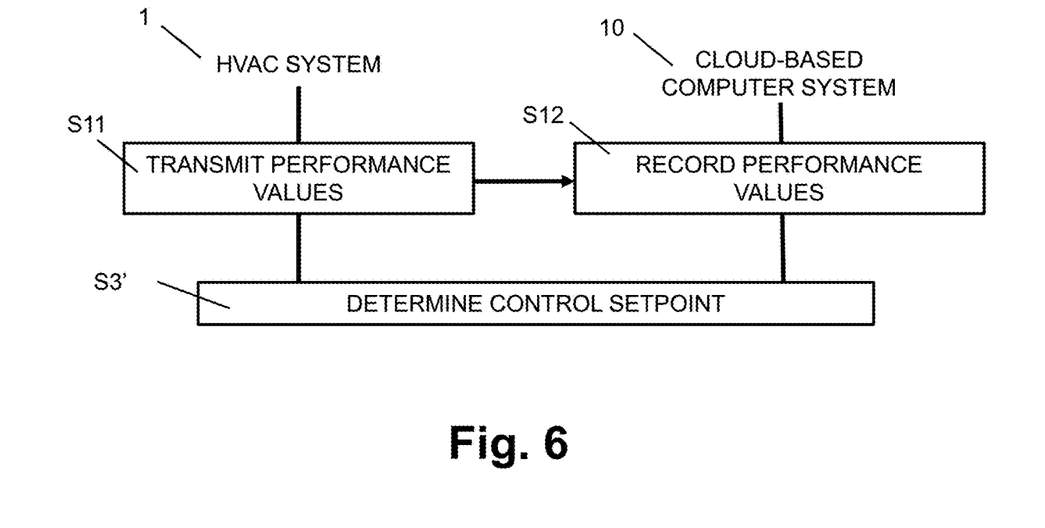
FIG. 6: shows a flow diagram illustrating an exemplary sequence of steps for determining a control setpoint an HVAC system.

FIG. 6 shows a block diagram illustrating an exemplary sequence of steps for determining the control setpoints S of the HVAC system 1. In step S11, the HVAC system, in particular the control device 22, transmits to the external computing device, in particular the cloud-based computer system 10, the performance values V. In step S12, the cloud-based computer system 10 records and stores the performance values V in a memory of the cloud-based computer system 10. In step S3', the control setpoints S are determined. The control setpoints S are determined, using the efficiency control algorithm, at least partially in the cloud-based computing system 10. The efficiency control algorithm is, in an embodiment, distributed between the HVAC system 1 and the cloud-based computer system 10, such that some steps and/or functions of the efficiency control algorithm are carried out in the former system and some are carried out in the latter. In particular, computationally complex steps and/or functions of the efficiency control algorithm, or those requiring the retrieval of relatively large amounts of data from memory, are preferentially carried out in the cloud-based computer system 10 due to its greater computational resources. In an embodiment, the control setpoints S are determined wholly in the cloud-based computer system 10 using the efficiency control algorithm. The control setpoints S are transmitted from the cloud-based computer system to the HVAC system 1.

Figure 7:
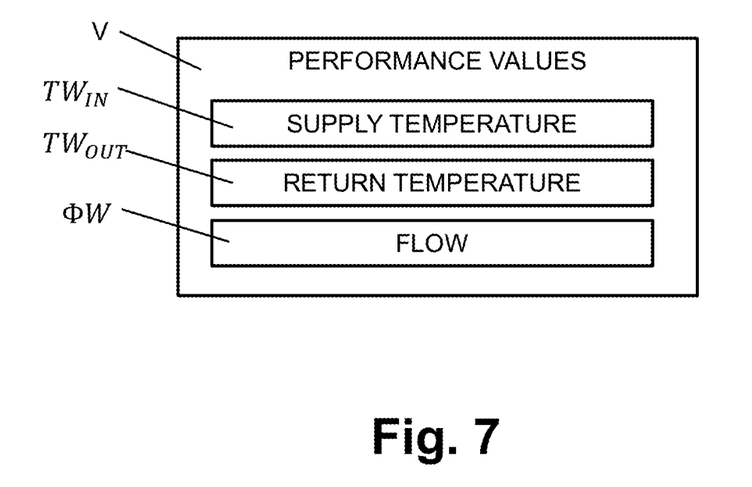
FIG. 7: shows a block diagram illustrating performance values of an HVAC system.

FIG. 7 shows a block diagram illustrating performance values V of the HVAC system 1. In addition to the parameters already mentioned, such as the current supply temperature $TW_{IN}$, the current return temperature $TW_{OUT}$, and the current flow rate ΦW, the performance values V include, depending on the embodiment, the flow rate of the secondary fluid A and/or the (output) downstream air temperature $TA_{OUT}$ of the air downstream from the thermal energy exchanger 2.

In an embodiment, the performance values V further include the (input) upstream air temperature $TA_{IN}$ of the air upstream from the thermal energy exchanger 12, a pump speed of the pump 191 of the primary fluid W, a fan speed of the fan 15, air humidity of the secondary fluid A, and/or weather data relating to the location of the HVAC system 1.

In an embodiment, the performance values V further include an electrical power consumption of an HVAC component of the HVAC system 1, an electrical power consumption of the thermal energy exchanger 12, an electrical power consumption of the pump 191, an electrical power consumption of the fan.

Figure 8:
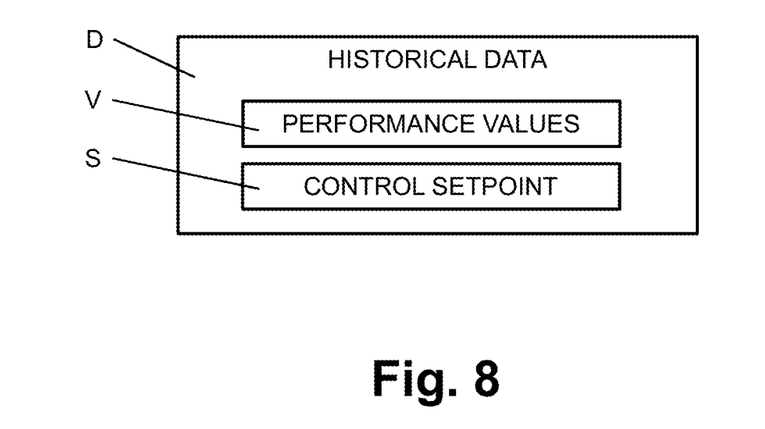
FIG. 8: shows a block diagram illustrating schematically historical data of an HVAC system.

FIG. 8 shows a block diagram illustrating historical data D of the HVAC system 1. The historical data D comprises the performance values V, as described above, and control setpoints S of a plurality of points in time extending into the past. For example, the historical data D comprises the performance values V and the control setpoints S recorded at one minute intervals extending one year into the past. In an embodiment, the historical data D is stored, wholly or partially, in the external computing device D.

Figure 9:
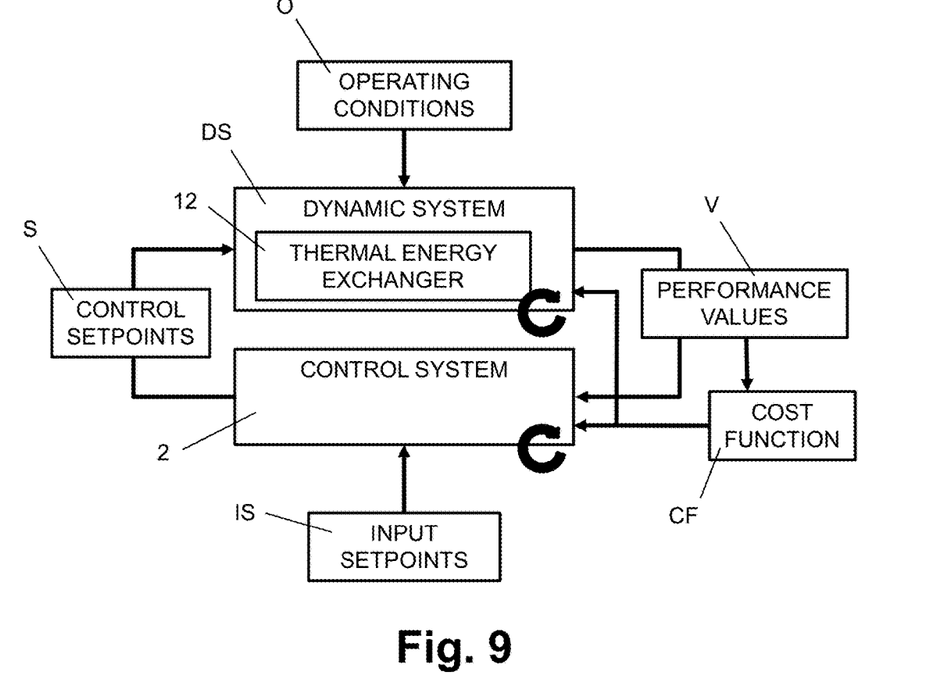
FIG. 9: shows a flow diagram illustrating an exemplary efficiency control algorithm.

FIG. 9 shows a flow diagram illustrating an exemplary efficiency control algorithm. This Figure is used to describe various implementations of efficiency control algorithms that are provided for use in the control device 22 of the HVAC system 1. Depending on the embodiment of the invention, a particular implementation of the efficiency control algorithm may be selected. As mentioned above, the control device 22 is integrated into the HVAC system 1. Depending on the embodiment, however, the control device 22 is external to and separate from the HVAC system, for example in the cloud-based computer system 10.

In general, the thermal energy exchanger 12 is part of a dynamic system DS in which heat is transferred from the primary fluid W to the secondary fluid A. As already mentioned above, the dynamic system DS is nonlinear, such that, for example, the thermal energy exchanged between the primary fluid W and the secondary fluid A is not linearly dependent on the flow rate of the primary fluid W, as driven by the pump 292, and neither is the thermal energy exchanged linearly dependent on the flow rate of the secondary fluid A, as driven by the fan 15. As there are many degrees of freedom in the dynamic system DS, the dynamics (e.g. the equations or model required to describe the dynamic system) of the thermal energy exchanger 12 are complex, in particular there is no easily derivable closed-form solution of the dynamic system DS. This is especially so as each HVAC system 1 may be configured differently, with slightly different components, and as each HVAC system 1 is not installed in precisely the same building or location and is not subject to identical operation conditions O.

A current state of the dynamic system DS is measured using sensors, in particular using the sensor unit 21, along with other sensors, such as the air temperature sensors of the air temperature controller 3. The sensors provide performance values V of the dynamic system DS, in particular the thermal energy exchanger 12, to the control system 2. The control system 2 also receives the input setpoints IS. The control device 22 is configured to determine the control setpoints S, using the efficiency control algorithm. The control setpoints S are used by actuators, in particular by the actuator 24 of the valve 23, to change the state of the dynamic system DS, in particular by reducing the current flow rate ΦW of the primary fluid W.

In an embodiment, the efficiency control algorithm comprises a data-driven model. The control device 22 is configured to use the historical data D to generate the data-driven model.

In an embodiment, the data-driven model is generated in the cloud-based computer system 10 using historical data D of the HVAC system 1. The data-driven model is then transmitted from the cloud-based computer system 10 to the control device 22. This allows the computationally expensive generation of the data-driven model to take place in the cloud-based computer system 10 which has greater computational resources than the control device 22 of the HVAC system 1.

In an embodiment, the data-driven model is recomputed by the control device 22 or the cloud-based computer system 10 regularly, for example weekly.

In an embodiment, the control device 22 is configured to implement the data-driven model comprising a performance model of the dynamic system DS, wherein the performance model is used by the control device 22 to determine the control setpoints S. As explained above, the dynamic system DS is non-linear and has a very large number of degrees of freedom. Therefore, a first-principles analysis is in general not useful. Regression and machine-learning, for example a neural network, are particularly useful for generating the performance model of the dynamic system DS. Depending on the embodiment, the performance model of the dynamic system comprises one or more of the following: a neural network model, a NARMAX (Nonlinear AutoRegressive Moving Average with eXogenous input) model, or a SINDy (Sparse Identification of Nonlinear Dynamics) model used to discover governing equations from noisy measurement data, in particular linear combinations of on-linear coefficients.

In an embodiment, the control device 22 is configured to implement a neural network for use in determining the control setpoints S. The neural network is well suited to the dynamics of the thermal energy exchanger 12 and therefore of the dynamic system DS.

In an embodiment, the control device 22 is configured to use SINDy for use in determining the control setpoints S. Using SINDy is advantageous as it uses a sparse regression to identify non-linear terms in the dynamic system DS. By promoting sparsity, the performance model is regularized and over-fitting is prevented. The SINDy model is particularly useful as the performance model is interpretable, and the non-linear dynamics of the dynamic system DS are able to be identified.

Further, depending on the embodiment, and in particular depending on the number of sensors and the number of performance values V, the performance model of the dynamic system DS uses Koopman operator theory to generate a linear representation of the non-linear dynamic system DS, by embedding the non-linear dynamic system an a higher dimensional space. In particular, the control device 22 is configured to use Koopman operator theory for use in determining the control setpoints S. This is possible because, as is known by one skilled in the art, once a linear representation of a given system as known, optimal control is possible, for example using a linear quadratic regulator (LQR).

The efficiency control algorithm comprises, depending on the embodiment, the performance model of the dynamic system DS as described above. In an embodiment, the control device 22 is configured implement performance models further augmented to include control, that is, the control device 22 is configured to use historical data D to generate the performance model of the dynamic system DS and the current performance values V are used to generate the control setpoints S to control the dynamic system DS according to the input setpoints IS.

In an embodiment, the control device 22 is configured to implement the efficiency control algorithm comprising a control model. In particular, the control system 2 is configured to use the control model to determine the control setpoints S using the performance values V and the input setpoints IS such as to avoid saturation of the thermal energy exchanger 12 and ensure energy efficient operation of the HVAC system 1. In an embodiment, the control device 22 is configured to implement the control model using machine learning, including adaptive neural networks, genetic algorithms, genetic programming, and/or reinforcement learning.

In an embodiment, the control device 22 is configured to iteratively optimize the control model by use of a cost function CF. The cost function CF takes as inputs the performance values V, and the control device 22 is configured to minimize an output of the cost function CF by iteratively adjusting the control model. In an embodiment, the cost function CF in particular is configured to depend on whether the thermal heat exchanger 12 is operating beyond the saturation point SP or not, such that, for example, the output of the cost function CF is higher if the thermal heat exchanger 12 is operating beyond the saturation point SP. In an embodiment, the cost function CF is configured to relate to the energy efficiency of the HVAC system 1, in particular the thermal energy transferred by the thermal heat exchanger 12 in relation to an overall power consumption of the HVAC system 1, in particular a power consumption of the pump 191, the fan 15, and/or of the water heater and/or cooler 19.

In an embodiment, the control device 22 is configured to use the cost function CF to optimize the performance model of the dynamic system DS, in particular by adjusting the performance model such that it better represents those characteristics of the dynamic system DS important for determining the energy efficiency of the HVAC system 1 and/or whether the thermal heat exchanger 12 is operating beyond the saturation point SP or not.

Depending on the embodiment, the control device 22 is configured to use the efficiency control algorithm not having a performance model of the dynamic system DS, rather, the control system 2 uses the control model, for example based on machine learning as described above, to control the unknown dynamical system DS.

In an embodiment, in particular in embodiments comprising a high-dimensional input into the control device 22 of a large number of performance values V, the efficiency control algorithm is configured to reduce the number of inputs. In particular, the control device 22 is configured to generate, using the performance values V, a compact representation. In an embodiment, the control device 22 is configured to use the efficiency control algorithm to generate the compact (lower dimensional) representation of the high dimensional performance values V using balanced model reduction, which compact (lower dimensional) representation is configured to capture the dynamics of the dynamic system DS and configured to allow effective measurement of the current state of the dynamic system DS, and therefore allow effective control of the dynamic system DS. In an embodiment, the compact representation comprises one or more control criteria, such as the temperature difference $\Delta TW = TW_{IN} - TW_{OUT}$ between the current supply temperature $TW_{IN}$ and the current return temperature $TW_{OUT}$. Analogously, the control criteria comprise, in an embodiment, a temperature difference between the upstream supply air 16 and the return air 18, and a temperature difference between the upstream supply air 16 and the downstream air temperature, and/or between the return air 18 and the downstream air temperature.

In an embodiment, the control system 2, and/or the cloud-based computing system 10, is further configured to use machine learning and the performance values V to optimize sensor placement and actuator placement for future HVAC systems 1.

Figure 10:
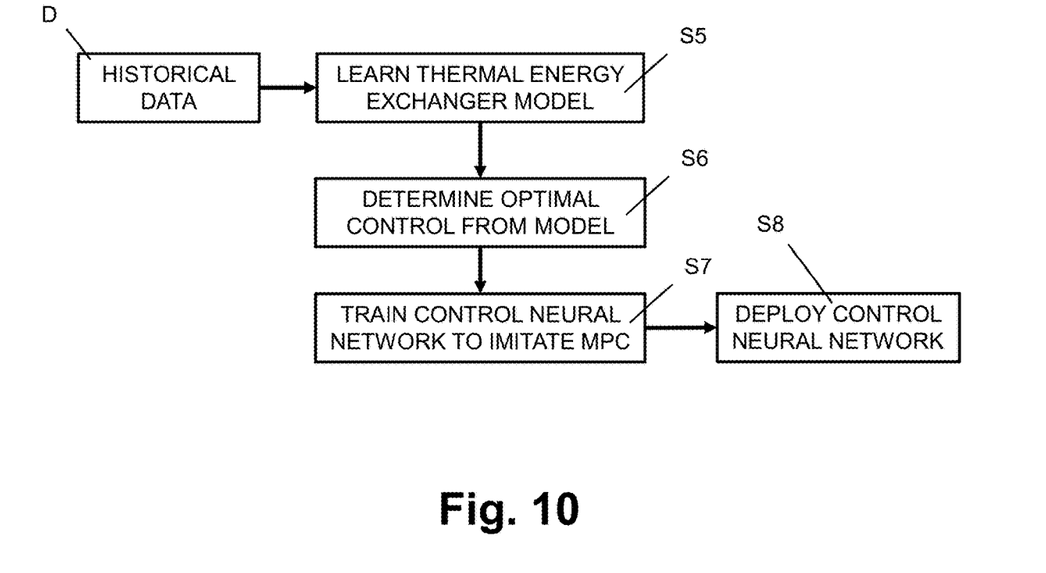
FIG. 10: shows a flow diagram illustrating an exemplary sequence of steps for generating an efficiency control algorithm.

FIG. 10 shows an exemplary sequence of steps for generating the efficiency control algorithm. In a preparatory step (not shown), the control device 22 transmits to the cloud-based computer system 10 historical data D. The control device 22 periodically transmits the historical data D to the cloud-based computer system 10, as the memory 222 of the control device 22 has only limited capacity, whereas the cloud-based computer system 10 has a much greater data storage capacity. In step S5, a thermal energy exchanger neural network is generated in the cloud-based computer system 10. In particular, the cloud-based computer system 10 is configured to implement the performance model by training a thermal energy exchanger neural network using the historical data D. During training, the cloud-based computer system 10 is configured to iteratively adjust the thermal energy exchanger neural network such that it accurately reflects the behaviour of the thermal energy exchanger 12. In step S6, the cloud-based computer system 10 is configured to use model predictive control (MPC) to determine the control setpoints S for given input setpoints IS. Additionally, MPC uses as an input, in an embodiment, the performance values V. Using MPC, the cloud-based computer system 10 iteratively determines the optimal control setpoints S. In step S7, a control neural network is generated in the cloud-based computer system 10, the control neural network being configured to generate similar control setpoints S as those generated using MPC. In particular, the cloud-based computer system 10 is configured to train the control neural network to generate similar control setpoints S for given input setpoints IS as the control setpoints S generated using MPC. In step S8, the control neural network is deployed to the HVAC system 1. The cloud-based computer system 10 transmits the control neural network to the control device 22. The control device 22 receives the control neural network and implements it, using received input setpoints IS to generate control setpoints S. Depending on the embodiment, in addition to the input setpoints IS, the control neural network also uses the performance values V to generate the control setpoints S.

In an embodiment, the cloud-based computer system 10 periodically retrains the control neural network using the historical data D. Thereby the control neural network is kept up-to-date regarding changes and trends as they are recorded in the historical data D. This is particularly useful for HVAC systems a for which not much historical data D has yet been recorded. The cloud-based computer system 10 is configured to transmit updated parameters of the control neural network to the control device 22, which control device 22 is configured to receive and store in the memory 222 the updated parameters for the control neural network and to implement the updated parameters in the control neural network. Thereby an accurate, efficient, and up-to-date efficiency control algorithm is implemented in the control device 22 that leverages the greater computational capabilities and storage capacities of the cloud-based computing system 10.

It should be noted that, in the description, the sequence of the steps has been presented in a specific order, one skilled in the art will understand, however, that the computer program code may be structured differently and that the order of at least some of the steps could be altered, without deviating from the scope of the invention.

The invention claimed is:

1. A method of controlling an orifice of a valve in an HVAC system to regulate a flow of a primary fluid through a primary side of a thermal energy exchanger of the HVAC system and thereby adjust a thermal energy transfer by the thermal energy exchanger from the primary fluid to a secondary fluid, flowing through a secondary side of the thermal energy exchanger, the method comprising:
   adjusting, by one or more electronic circuits, the orifice of the valve by applying an efficiency control algorithm to a control setpoint for the valve, the efficiency control algorithm processing the control setpoint for the valve to maintain energy-efficient thermal energy transfer by avoiding saturation of the primary side of the thermal energy exchanger;
   wherein the method further comprises the one or more electronic circuits determining the control setpoint for the valve, using current performance values of the HVAC system and recorded historical data of the HVAC system;
   wherein the current performance values of the HVAC system include at least one of: a current supply temperature of the primary fluid, or a current return temperature of the primary fluid; and
   wherein the recorded historical data of the HVAC system include for each of a plurality of past points in time, extending from a current time-point into the past, performance values of the HVAC system measured at the respective point in time and the control setpoint of the valve at the respective point in time.

2. The method of claim 1, wherein the recorded historical data of the HVAC system comprises for each of the plurality of past points in time the performance values of the HVAC system measured at the respective point in time for the control setpoint of the valve at the respective point in time, and the control setpoint of the valve at the respective point in time.

3. The method of claim 1, wherein the method comprises the one or more electronic circuits implementing a neural network for determining the control setpoint, using the current performance values of the HVAC system and the recorded historical data of the HVAC system.

4. The method of claim 1, wherein the method comprises the one or more electronic circuits generating a performance model of the HVAC system, using the recorded historical data of the HVAC system; and determining the control setpoint for the valve, using the performance model of the HVAC system.

5. The method of claim 4, wherein the method comprises the one or more electronic circuits implementing a neural network for generating the performance model of the HVAC system.

6. The method of claim 1, wherein applying the efficiency control algorithm to the control setpoint for the valve comprises the one or more electronic circuits maintaining the control setpoint for the valve unchanged, if the control setpoint leads to operating the thermal energy exchanger in a zone of energy-efficient thermal energy transfer, where an increase in a flow rate of the primary fluid leads to a defined minimum increase in the thermal energy transfer by the thermal energy exchanger, and altering the control setpoint for the valve to decrease the orifice of the valve, if the control setpoint does not lead to operating the thermal energy exchanger in the zone of energy-efficient thermal energy transfer.

7. The method of claim 1, wherein the method comprises the one or more electronic circuits applying the efficiency control algorithm to the control setpoint for the valve by determining a control criterion, using at least one of: a temperature difference between the current supply temperature of the primary fluid and the current return temperature of the primary fluid, or a current flow of the primary fluid; maintaining the control setpoint for the valve unchanged, if the control criterion is at or above an efficiency threshold value, and altering the control setpoint for the valve to decrease the orifice of the valve, if the control criterion is below the efficiency threshold value.

8. The method of claim 1, wherein the method comprises the one or more electronic circuits determining the control setpoint for the valve from an initial setpoint for the valve, the initial setpoint for the valve comprising one of: an initial valve position setpoint, an initial flow setpoint, an initial setpoint for a temperature difference between the current supply temperature of the primary fluid and the current return temperature of the primary fluid, or an initial power setpoint for the valve; and determining the control setpoint for the valve comprises the one or more electronic circuits determining one of: a defined valve position setpoint, a defined flow setpoint, a control setpoint for the temperature difference, a defined power setpoint for the valve.

9. The method of claim 1, wherein the recorded historical data of the HVAC system for the respective past points in time, further comprise at least one of: a flow of the secondary fluid, an input temperature of the secondary fluid entering the secondary side of the thermal energy exchanger, an output temperature of the secondary fluid exiting the secondary side of the thermal energy exchanger, electrical power consumption of an HVAC component of the HVAC system, electrical power consumption of the thermal energy exchanger, a pumping speed of a pump driving the primary fluid through the primary side of the thermal energy exchanger, electrical power consumption of the pump, a fan speed of a fan driving the secondary fluid through the secondary side of the thermal energy exchanger, electrical power consumption of the fan, a humidity level of the secondary fluid, or weather data related to an area where the HVAC system is located.

10. The method of claim 1, wherein the method further comprises the one or more electronic circuits determining at least one of: a pump set point for a pump driving the primary fluid through the primary side of the thermal energy exchanger, or a fan setpoint for a fan driving the secondary fluid through the secondary side of the thermal energy exchanger, using the current performance values of the HVAC system and the recorded historical data of the HVAC system.

11. The method of claim 1, wherein the method further comprises recording and storing the performance values of the HVAC system in a cloud-based computer system remote from the HVAC system; and determining the control setpoint for the valve at least partially by one or more electronic circuit arranged in the cloud-based computer system.

12. A control system for controlling an orifice of a valve in an HVAC system to regulate a flow of a primary fluid through a primary side of a thermal energy exchanger of the HVAC system and thereby adjust a thermal energy transfer by the thermal energy exchanger from the primary fluid to a secondary fluid flowing through a secondary side of the thermal energy exchanger, the control system comprising one or more electronic circuits configured to:
adjust the orifice of the valve by applying an efficiency control algorithm to a control setpoint for the valve, the efficiency control algorithm processing the control setpoint for the valve to maintain energy-efficient thermal energy transfer by avoiding saturation of the primary side of the thermal energy exchanger;
wherein the one or more electronic circuits are further configured to determine the control setpoint for the valve, using current performance values of the HVAC system and recorded historical data of the HVAC system,
wherein the current performance values of the HVAC system include at least one of: a current supply temperature of the primary fluid, or a current return temperature of the primary fluid; and
wherein the recorded historical data of the HVAC system include for each of a plurality of past points in time, extending from a current time-point into the past, performance values of the HVAC system measured at the respective point in time and the control setpoint of the valve at the respective point in time.

13. The control system of claim 12, wherein the one or more electronic circuits are further configured to implement a neural network for determining the control setpoint for the valve, using the current performance values of the HVAC system and the recorded historical data of the HVAC system.

14. The control system of claim 12, wherein the one or more electronic circuits are further configured to generate a performance model of the HVAC system, using the recorded historical data of the HVAC system; and determine the control setpoint for the valve, using the performance model of the HVAC system.

15. The control system of claim 14, wherein the one or more electronic circuits are further configured to implement a neural network for generating the performance model of the HVAC system.

16. The control system of claim 12, wherein the one or more electronic circuits are configured to apply the efficiency control algorithm to the control setpoint for the valve by maintaining the control setpoint for the valve unchanged, if the control setpoint leads to operating the thermal energy exchanger in a zone of energy-efficient thermal energy transfer, where an increase in the flow of the primary fluid leads to a defined minimum increase in the thermal energy transfer by the thermal energy exchanger, and altering the control setpoint for the valve to decrease the orifice of the valve, if the control setpoint does not lead to operating the thermal energy exchanger in the zone of energy-efficient thermal energy transfer.

17. The control system of claim 12, wherein the one or more electronic circuits are configured to apply the efficiency control algorithm to the control setpoint for the valve by determining a control criterion, using at least one of: a temperature difference between the current supply temperature of the primary fluid and the current return temperature of the primary fluid, or a current flow of the primary fluid; maintain the control setpoint for the valve unchanged, if the control criterion is at or above an efficiency threshold value, and alter the control setpoint for the valve to decrease the orifice of the valve, if the control criterion is below the efficiency threshold value.

18. The control system of claim 12, wherein the one or more electronic circuits are configured to determine the control setpoint for the valve from an initial setpoint for the valve, the initial setpoint for the valve comprising one of: an initial valve position setpoint, an initial flow setpoint, an initial setpoint for a temperature difference between the current supply temperature of the primary fluid and the current return temperature of the primary fluid, or an initial power setpoint for the valve; and determining the control setpoint for the valve comprises the one or more electronic circuits determining one of: a defined valve position setpoint, a defined flow setpoint, a control setpoint for the temperature difference, or a defined power setpoint for the valve.

19. The control system claim 12, wherein the recorded historical data of the HVAC system for the respective past points in time, further comprise at least one of: a flow of the secondary fluid, an input temperature of the secondary fluid entering the secondary side of the thermal energy exchanger, an output temperature of the secondary fluid exiting the secondary side of the thermal energy exchanger, electrical power consumption of an HVAC component of the HVAC system, electrical power consumption of the thermal energy exchanger, a pumping speed of a pump driving the primary fluid through the primary side of the thermal energy exchanger, electrical power consumption of the pump, a fan speed of a fan driving the secondary fluid through the secondary side of the thermal energy exchanger, electrical power consumption of the fan, a humidity level of the secondary fluid, or weather data related to an area where the HVAC system is located.

20. The control system claim 12, wherein the one or more electronic circuits are further configured to determine at least one of: a pump set point for a pump driving the primary fluid through the primary side of the thermal energy exchanger, or a fan setpoint for a fan driving the secondary fluid through the secondary side of the thermal energy exchanger, using the current performance values of the HVAC system and the recorded historical data of the HVAC system.

21. The control system claim 12, wherein at least some of the one or more electronic circuits are arranged in a cloud-based computer system remote from the HVAC system and configured to record and store the performance values of the HVAC system in the cloud-based computer system; and the one or more electronic circuits are configured to determine the control setpoint for the valve at least partially in the cloud-based computer system.

22. A computer program product comprising a non-transitory computer readable-medium having stored thereon computer program code configured to control one or more electronic circuits of a control system to perform the method according to claim 1.

* * * * *